March 24, 1936.  D. H. SPITZLI  2,034,927
FLOOR SURFACING STRUCTURE
Filed June 30, 1934
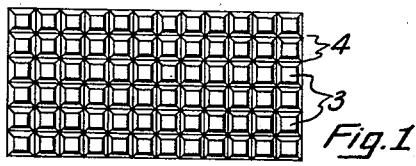
Fig.1
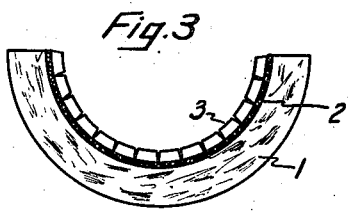
Fig.3
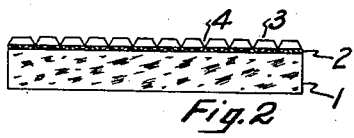
Fig.2
Fig.4
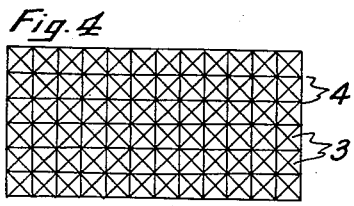
Fig.6
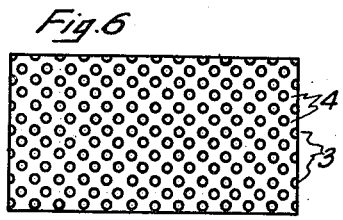
Fig.5
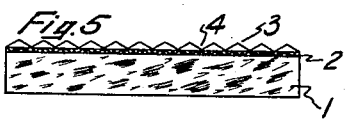
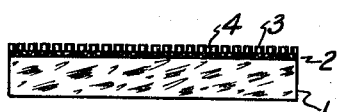
Fig.7
Fig.8
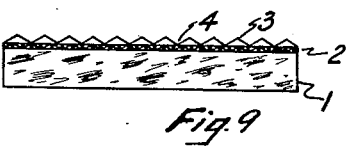
Fig.9
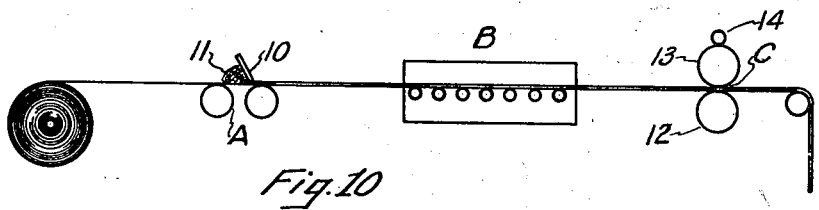
Fig.10
INVENTOR
DONALD H. SPITZLI
BY Gordon C. Willard
ATTORNEY Patented Mar. 24, 1936

2,034,927

UNITED STATES PATENT OFFICE 2,034,927

FLOOR SURFACING STRUCTURE

Donald H. Spitzli, Arlington, N. J., assignor to Congoleum-Nairn Inc., a corporation of New York Application June 30, 1934, Serial No. 733,170

3 Claims. (Cl. 154—49)

The present invention relates to smooth surface coverings of the lineoleum or felt base types or the like and more particularly to certain improvements in the novel floor surfacing structures described and claimed in Patent No. 1,970,503 granted August 14, 1934 to A. W. Hawkes and R. D. Bonney, such surfacing structures being characterized by having a cementitious layer on the back thereof and being ready-to-lay in bonded relation to a sub-surface without the employment of additional pastes or cements. Pre-formed floor surfacing structures of the type referred to comprise in composite form a body portion having a wearing or ornamental surface, in combination with a layer of cementitious material applied to the back or lower face of the body portion and adapted to bond the body portion to the sub-surface that is to be protected or decorated. As a more specific example such floor surfacing structures may comprise a body portion including a strain-resisting foundation member having on one face a surfacing layer and on the other face such a layer of cementitious material. The surfacing layer of the body portion may be wear-resisting or ornamental or both and may be of paint or linoleum composition or equivalent composition constituting a layer carried upon and integral with one side of the foundation member. The foundation member is preferably a sheet-like materal suitable as a backing for such surfacing composition, as for example, a woven fabric such as burlap, impregnated felt, or a combination of dry or impregnated felt and a woven fabric, to the end that the foundation member will be resistant to tearing and substantially non-stretchable and resistant to distortion by compression. The cementitious material employed may be of a permanently sticky character, in which case it will be covered with a protecting sheet which is removed when the covering is installed, or such cementitious material may be of a normally non-sticky, non-tacky character but adapted to be activated, as by the application of an appropriate solvent, to impart adhesive properties thereto. Cementitious material of the latter type is usually of a relatively non-flexible nature and adapted to harden upon the evaporation of the activating solvent to provide a rigid or semi-rigid bond between the surface covering and the sub-surface.

The employment of a cementitious material which is of a relatively non-flexible nature, while advantageous from the standpoint of the final installation obtainable therewith, is disadvantageous from other standpoints. Thus, for example, such an adhesive sharply reduces the flexibility of the floor surfacing structure as a whole rendering it more difficult to roll and unroll, cut, fit, and install. Furthermore, such a non-flexible adhesive tends to crack and chip off when the surface covering is rolled, transported, and handled in the normal course of packaging, distributing, and installing. This result, although it may not impair the serviceability or utility of the product, does give to the goods an unsightly appearance and casts doubt upon its acceptability as perfect material.

My invention is directed to the elimination of these defects while preserving the general advantages of this type of cementitious material. Thus, I have discovered that all the disadvantages may be overcome and important new advantages imparted to pre-formed ready-to-lay floor surfacing structures with which my invention is concerned, if, when employing a cementitious material of a relatively inflexible character, such cementitious material be applied to the back or lower face of the foundation member in segregated deposits or essentially non-contiguous sections, or in areas covered with a relatively thick layer of the adhesive between which are separating areas covered with a thinner layer of cementitious material. The sub-divided deposits or the areas of heavier coating will be of such size, shape, and distribution that the flexibility of the surface covering is substantially unimpaired and so that the sections of adhesive, upon activation with an appropriate solvent, may be easily spread to form a substantially continuous layer of uniform thickness over the under-surface of the covering. I have further discovered that the application of the cementitious material in the manner described greatly facilitates its activation by providing a net-work of channels or grooves through which the activating solvent may flow whereby such solvent is more readily and uniformly distributed throughout the area of the cementitious material undergoing activation.

The accompanying drawing illustrates various embodiments of my invention showing several modes of application of the cementitious material in accordance with the principles of my invention. Corresponding parts in the several figures are identified by the same numeral. Figure 1 is a plan view and Figure 2 is an elevation of one preferred embodiment of my invention. Figure 3 is an elevation similar to Figure 2 illustrating the formation of the sub-divided adhesive layer as the goods are rolled or flexed. Figures 4, 5, 6, 7, and 8, 9 are respectively plan views and elevations illustrating various alternative modes of application of the cementitious material. Figure 10 is a diagrammatic view illustrating one method and the equipment for applying cementitious material in accordance with my invention.

Referring to Figures 1 to 9 inclusive, the improved floor surfacing structure of my invention comprises a body portion including a surface layer 1 constituting a wearing or ornamental portion, and a foundation member 2 consisting of a woven fabric such as burlap, or a felted sheet such as impregnated felt, or a combination of felt and fabric. The surfacing layer 1 may be of paint or linoleum or similar drying oil composition, or equivalent composition, carried integral with the foundation member and with it constituting the body portion of the floor surfacing structure. In combination with such body portion is a layer of normally non-sticky cementitious material integral with the lower face of the foundation member and comprising areas or sections 3 of substantial thickness separated by grooves or channels 4. Preferably the grooves or channels 4 form a continuous net-work throughout the cementitious layer.

A variety of satisfactory cementitious materials may be used and the present invention is not to be construed as limited to any specific type. For practical purposes it will be found desirable that the cementitious material should possess the following characteristic properties, namely, (a) remain dry, non-sticky and non-tacky under normal conditions of storing, shipping, and merchandising, (b) be substantially unaffected by temperature or humidity variations and by small amounts of moisture, (c) be readily activated upon application of an appropriate solvent, (d) possess high bonding strength when activated, and (e) harden upon evaporation of a solvent to form a rigid or semi-rigid bond. Preferably the cementitious material should also be unaffected by alkalies inasmuch as floor surface coverings are frequently required to be installed over moist concrete where they are subject to the action of alkaline solution. The cementing materials may be of such composition as to be activated by either a non-aqueous solvent or by water. When employing a cementitious material adapted to be activated by a non-aqueous solvent it will be found preferable to select an adhesive which may be activated with a water-miscible solvent in order to facilitate dissipation of the solvent and hardening of the adhesive in those cases where the sub-surfaces may contain moisture.

One suitable type of cementing material adapted to be activated by a non-aqueous solvent comprises a mixture of cellulose ester and a resin with sufficient plasticizer to render the composition non-brittle yet relatively non-flexible. A typical example of such an adhesive consists of nitro-cellulose 25%, rosin 25%, and dibutyl phthalate 50%. The cementing material may be prepared for application to the back of the floor surfacing structure by dissolving these constituents in a solvent comprising ethyl acetate three parts, toluol one part, and ethyl alcohol two parts. If desired pigments may be added. The preferred solvent to be employed in activating this adhesive will be alcohol or a similar water-miscible solvent.

One suitable type of water activated cementitious material fulfilling the general requirements above outlined comprises a mixture of clay and lignin with the addition of a small amount of plasticizing agent. A typical formula for such adhesive is clay 55%, lignin 42%, and glycerine 3%. The term "lignin" refers to an article of commerce obtained by evaporation of waste sulphite liquors from the wood pulp industry. The cement may be prepared for application to the back of the surface covering by forming a paste comprising two to three parts of the above clay-lignin-glycerine mixture and one part of water. Water will of course be used to activate this adhesive material when the surface covering is installed.

The preferred method of applying the cementitious material is illustrated in Figure 10. The floor surface covering is passed face downward through a coating device A, equipped with a doctor blade 10. The cementitious material 11, in fluid state through the addition of an appropriate solvent as above described, is fed to the coater and uniformly applied by the doctor blade as the floor covering passes thereunder. The coating device may be regulated to apply any desired quantity of cementitious material but, in general, about one pound (wet) per square yard will be found satisfactory. The coated web is next passed through a drying zone B. Such zone may consist of a closed chamber which may be heated, or force ventilated, or both, or it may simply consist of an open space through which the web moves while the adhesive is subjected to air-drying. The extent of drying or solvent evaporation is so regulated that a "skinning" of the surface of the adhesive occurs with an accompanying substantial reduction in tackiness, while the body of the cementitious material still remains plastic. The web of floor covering carrying the layer of partially hardened cementitious material is then drawn through an embossing device C, comprising a driven supporting roll 12, an embossing roll 13, and a lubricating mechanism or roll 14 for continuously lubricating the embossing roll with machine oil or the like to prevent sticking. A suitable embossing roll consists of a wood drum, the peripheral surface of which is fitted with a net-work of brass strips, .020" in thickness, placed on edge and forming pockets of about ¼" by ¼" between the faces of adjacent strips. In passing through the embossing device the plastic cementitious material is displaced and sub-divided into sections or areas covered with a substantial thickness of adhesive which areas are separated by a net-work of channels or grooves, produced by the raised portions of the embossing roll, covered with little or no adhesive. The adhesive coating is finally further treated to evaporate the remaining solvent, thereby producing a layer which is non-sticky and non-tacky until activated.

The particular configuration of the sub-divided cementitious layer is not an essential feature of my invention. It is only of importance that the areas or sections covered with little or no adhesive material be sufficiently numerous and so located that the flexibility of the product be substantially unimpaired and that the areas or sections covered with a substantial thickness of adhesive be in such proximity that the cementitious material when activated may be readily spread to form a continuous layer of uniform thickness. In Figures 4, 6, and 8 I have illustrated other suitable forms for the cementitious layer. If desired trade-marks or other indicia may be impressed in the cementitious layer in the manner indicated. Likewise the cementitious material may be applied in other ways than the preferred method of embossing as above described. Thus the adhesive may be deposited in non-contiguous areas by printing, or it may be spread in a continuous layer and subsequently cross-hatched with a suitable scraping tool before or after partial setting.

It will be apparent that my invention overcomes the defects heretofore encountered in employing a non-flexible layer of cementitious material in floor surfacing structures of the type described and also imparts to such products a novel and highly attractive appearance. The dividing areas or grooves covered with little or no rigid cementitious material provide a multiplicity of flexing points so that the flexibility of the structure as a whole is substantially unimpaired. The essentially non-contiguous relationship of the multitude of sections or areas of adhesive of substantial thickness avoids all difficulty from cracking or chipping off of such cementitious material. Furthermore the recessed areas between the deposits or sections of adhesive form channels which greatly facilitate the uniform distribution of the activating solvent when the covering is installed.

Linoleum or the like floor surfacing structure, prepared as above described, may be rolled, shipped, stored, and merchandised in the usual manner since the normal variations in atmospheric temperature and humidity conditions existing during such handling have substantially no effect on the cementitious coating.

From the above description of the product and its characteristics, the manner of installing this improved type of floor surfacing structure will be readily apparent. A strip of the goods is first fitted to the floor or other sub-surface. The layer of cementing material is then activated by a thorough application, as with a sponge, of an appropriate solvent to spread the sub-divided adhesive into a continuous layer of substantially uniform thickness. The fitted strip carrying the activated adhesive is then pressed onto the surface which it is to cover. Upon the evaporation or dissipation of the solvent the adhesive forms a rigid or semi-rigid bond substantially permanently uniting the surface covering and the sub-surface.

Modifications in the application of our invention will undoubtedly suggest themselves to those skilled in the art and I do not wish to limit the scope of the same except as defined in the appended claims. In this connection it is to be noted that the terms "floor covering" or "floor surfacing structure" as used herein are intended to apply equally to materials used for floors, walls, or other rigid or structural surfaces.

I claim:
1. As a new article of manufacture, a preformed floor surfacing structure ready-to-lay in bonded relation to a sub-surface, comprising a body portion one face of which constitutes a wearing surface, in combination with a layer of non-sticky cementitious material integral with the opposite face of said body portion and subject upon flexure of the surfacing structure to cracking that increases the flexibility of the structure at the resultant cracks and adapted to be activated to impart thereto adhesiveness to bond the body portion to the sub-surface to which it may be applied, said layer of cementitious material being sub-divided into essentially non-contiguous sections of such dimensions as to preserve substantially uniform flexibility throughout the structure.

2. As a new article of manufacture, a preformed floor surfacing structure ready-to-lay in bonded relation to a sub-surface, comprising a body portion one face of which constitutes a wearing surface, in combination with a layer of non-sticky cementitious material integral with the opposite face of said body portion and subject upon flexure of the surfacing structure to cracking that increases the flexibility of the structure at the resultant cracks and adapted to be activated to impart thereto adhesiveness to bond the body portion to the sub-surface to which it may be applied, said layer of cementitious material being sub-divided into essentially non-contiguous sections of such thickness and proximity as to permit spreading of the cementitious material to a continuous layer of uniform thickness when activated to adhesive condition.

3. As a new article of manufacture, a preformed floor surfacing structure ready-to-lay in bonded relation to a sub-surface, comprising a body portion one face of which constitutes a wearing surface, in combination with a layer of non-sticky cementitious material integral with the opposite face of said body portion and subject upon flexure of the surfacing structure to cracking that increases the flexibility of the structure at the resultant cracks and adapted to be activated to impart thereto adhesiveness to bond the body portion to the sub-surface to which it may be applied, said layer of cementitious material being provided with a succession of areas of lesser thickness dividing said layer into sections and so closely located as to preserve subtantially uniform flexibility throughout the structure.

DONALD H. SPITZLI.